(12) United States Patent
Ishikura

(10) Patent No.: US 11,318,820 B2
(45) Date of Patent: May 3, 2022

(54) MIRROR UNIT

(71) Applicant: KYOWA SANGYO CO., LTD., Toyota (JP)

(72) Inventor: Kunihiko Ishikura, Toyota (JP)

(73) Assignee: KYOWA SANGYO CO., LTD., Toyota (JP)

( * ) Notice: Subject to any disclaimer, the term of this patent is extended or adjusted under 35 U.S.C. 154(b) by 143 days.

(21) Appl. No.: 16/642,975

(22) PCT Filed: Aug. 29, 2018

(86) PCT No.: PCT/JP2018/032037
§ 371 (c)(1),
(2) Date: Feb. 28, 2020

(87) PCT Pub. No.: WO2019/044936
PCT Pub. Date: Mar. 7, 2019

(65) Prior Publication Data
US 2020/0254854 A1     Aug. 13, 2020

(30) Foreign Application Priority Data

Sep. 1, 2017  (JP) .............................. JP2017-168749

(51) Int. Cl.
*G02B 5/08* (2006.01)
*B60J 3/02* (2006.01)
*G02B 27/00* (2006.01)

(52) U.S. Cl.
CPC ........ *B60J 3/0282* (2013.01); *G02B 27/0006* (2013.01)

(58) Field of Classification Search
CPC ........................... B60J 3/0282; G02B 27/0006
USPC ........................................................... 359/844
See application file for complete search history.

(56) References Cited

U.S. PATENT DOCUMENTS

2012/0112490 A1* 5/2012 Fukatsu ................. B60J 3/0282
                                                                296/97.1

FOREIGN PATENT DOCUMENTS

| JP | 2006-199186 A | 8/2006 |
|----|---------------|--------|
| JP | 2009-018688 A | 1/2009 |
| JP | 2012-101623 A | 5/2012 |

OTHER PUBLICATIONS

Aug. 5, 2021 Office Action issued in Indian Patent Application No. IN 202017008626.

* cited by examiner

*Primary Examiner* — Euncha P Cherry
(74) *Attorney, Agent, or Firm* — Oliff PLC

(57) ABSTRACT

A mirror unit mounted on a sun visor main body of a vehicle sun visor includes a slide mechanism configured by a pair of guide rails that guides both edges of a slide lid. Ends of the pair of guide rails have curved surfaces that allow the slide lid to be obliquely inserted into the pair of guide rails in such a manner that the knob of the slide lid runs over the frame when the slide lid is attached to the pair of guide rails of the frame such that both edges of the slide lid are respectively guided.

3 Claims, 10 Drawing Sheets

FIG. 7
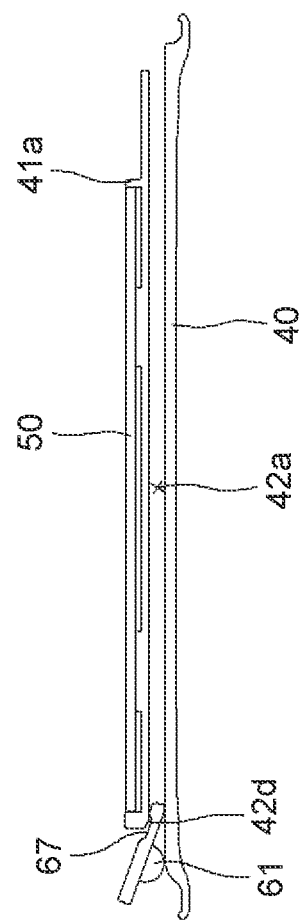
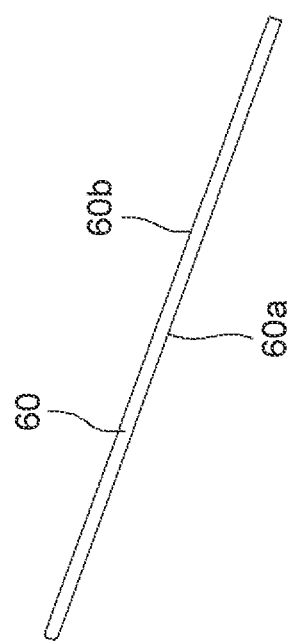

FIG. 9
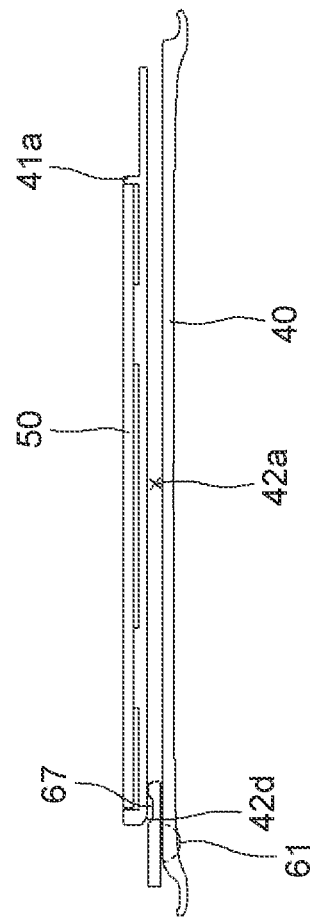
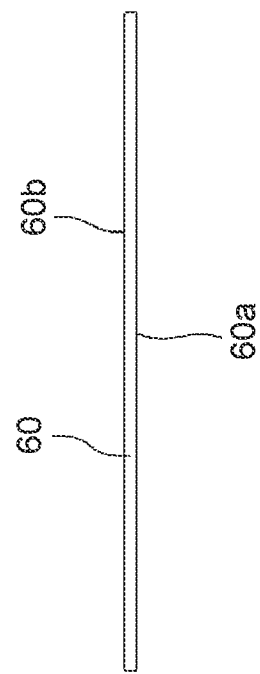

though, in the technique of Patent Literature 1 described
MIRROR UNIT

TECHNICAL FIELD

The present invention relates to a mirror unit, and more particularly, to a mirror unit mounted on a sun visor main body of a vehicle sun visor.

BACKGROUND ART

Conventionally, a sun visor is attached to a vehicle such as an automobile, as a sunshade member. Such a sun visor includes a substantially rectangular sun visor main body and an arm used for attaching the sun visor main body to the vehicle side so as to be rotatable between a usable position and a storage position. A mirror unit that can be used by an occupant is mounted on the sun visor main body at its usable position. This mirror unit includes: a frame; a mirror attached to the frame; a slide lid attached to the frame; a slide mechanism that slides the slide lid relative to the frame between an open position at which a mirror surface of the mirror is exposed and a closed position at which the mirror surface of the mirror is covered; and a position holding mechanism that can hold the slide lid having been slid by the slide mechanism at the open position or at the closed position. With this slide mechanism, when the mirror is not used, it is possible to prevent dust and dirt from adhering to the mirror surface. In addition, this position holding mechanism can prevent the slide lid from moving at the open position or at the closed position.

CITATION LIST

Patent Literature

Patent Literature 1
Japanese Patent Application Publication No. 2012-101623

SUMMARY OF THE INVENTION

Technical Problem

However, in the technique of Patent Literature 1 described above, the slide lid is provided with a knob for assisting the slide. Therefore, when the slide lid is attached to the frame, three steps (step B1 to step B3) are required for this attachment work in order to prevent the knob from interfering with the frame. Describing these three steps, step B1 is an operation of inserting one edge of the slide of the slide lid into one guide rail of the slide mechanism. Next, step B2 is an operation of inserting the other edge of the slide of the slide lid into the other guide rail of the slide mechanism.

Finally, step B3 is an operation of sliding the slide lid, in a state in which the both edges of the slide are inserted into the pair of guide rails of the slide mechanism, to the closed position at which the mirror surface of the mirror is covered. Since the above three steps are required, this attachment work is troublesome.

The present invention has been made in order to solve such a problem, and an object thereof is to provide a mirror unit that simplifies an attachment work of a slide lid provided with a knob relative to a frame.

Solution to Problem

The present invention has been made in order to achieve the above object and is configured as follows. As set forth in a first aspect, a mirror unit is mounted on a sun visor main body of a vehicle sun visor. This mirror unit includes: a frame-shaped frame separate from or integral with the sun visor main body; a mirror attached to the frame; a slide lid attached to the frame and having a knob; and a slide mechanism sliding the slide lid relative to the frame between an opening position at which a mirror surface of the mirror is exposed and a closing position at which the mirror surface of the mirror is covered. The slide mechanism is configured by a pair of guide rails that guides both edges of the slide lid. Ends of the pair of guide rails are provided with curved surfaces that allow the slide lid to be obliquely inserted into the pair of guide rails in such a manner that the knob of the slide lid runs over the frame when the slide lid is attached to the pair of guide rails of the frame such that the both edges of the slide lid are guided by the respective guide rails.

According to the first aspect, when the slide is attached to the frame, it is possible to prevent the knob of the slide lid from interfering with the frame, so that this attachment work can be completed in only two steps. Therefore, it is possible to simplify the attachment work of the slide lid provided with the knob relative to the frame.

As set forth in a second aspect, the mirror unit is according to the first aspect, wherein the slide lid is provided with recess portions at portions facing the curved surfaces of the pair of guide rails in a state of being obliquely inserted.

According to the second aspect, when the slide lid is attached to the frame, the slide lid hardly interferes with the curved surface of the frame. Therefore, the slide lid can be smoothly attached to the frame.

As set forth in a third aspect the mirror unit is according to the first aspect or the second aspect, wherein recess portions are formed at ends of the pair of guide rails.

According to the third aspect, when the slide lid is attached to the frame, a wider space of the frame for accepting the end of the slide lid on the attachment side (insertion side) can be secured. Therefore, the slide lid can be smoothly attached to the frame.

BRIEF DESCRIPTION OF THE DRAWINGS

FIG. 7 is a view explaining a step subsequent to FIG. 6.
FIG. 9 is a view explaining a step subsequent to FIG. 7.

MODES FOR CARRYING OUT THE INVENTION

Hereinafter, embodiments for carrying out the present invention will be described with reference to FIGS. 1 to 10. In the following description, upper, lower, front, rear, left, and right denote upward, downward, frontward, rearward, leftward, and rightward directions described in FIG. 1, that is, upward, downward, frontward, rearward, leftward, and rightward directions in a state in which an outer surface 15 of one half body 3 of a sun visor 1 is viewed in a plan view.

Figure 1:
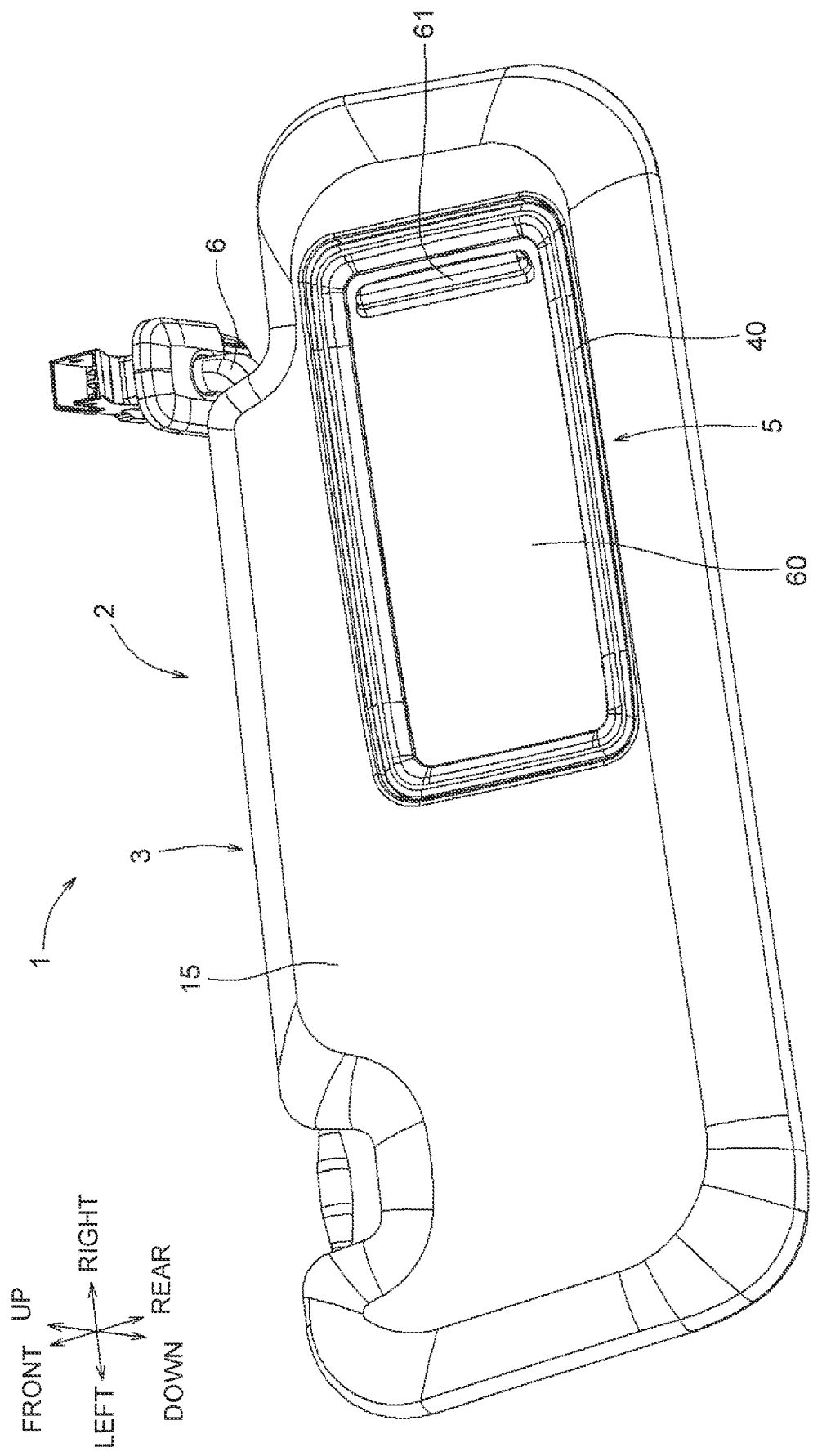
FIG. 1 is a perspective view of a vehicle sun visor according to an embodiment.

As shown in FIG. 1, the sun visor 1 includes: a rectangular (horizontally long) sun visor main body 2; an approximately L-shaped arm 6 used for attaching the sun visor main body 2 to an automobile; and a skin (not shown) covering the sun visor main body 2. This skin is a well-known one, and illustration thereof is omitted for the sake of easy understanding of the structure of the sun visor main body 2.

First, with reference to FIG. 1, the sun visor main body 2 will be described. The sun visor main body 2 is configured such that a pair of shell-shaped half bodies 3 are overlapped with and joined to each other.

Here, with reference to FIGS. 2 to 3, a mirror unit 5 mounted on one half body 3 will be described in detail. The mirror unit 5 includes: a frame 40; a mirror 50; a slide lid 60; a slide mechanism 70; and a position holding mechanism 80. Hereinafter, the frame 40, the mirror 50, the slide lid 60, the slide mechanism 70, and the position holding mechanism 80 will be described individually.

The frame 40 is configured by a rectangular frame-shaped member having a main opening 40a with four corners each formed in an R portion 40b. This main opening 40a includes: a first auxiliary opening 40c corresponding to the mirror 50 described later; and a second auxiliary opening 40d corresponding to a lamp unit (not shown) adjacent to the first auxiliary opening 40c. Side walls 41 are formed respectively at both longer edges of the frame 40. The respective side walls 41 on one end side (on the front end side in the closing direction of the slide lid 60) are bridged by a bridging member 41a.

The inner surfaces of the side walls 41 are formed respectively with holding portions 42 extending along the longitudinal direction. Thereby, slide grooves 42a that can slide longer edges 65 of the slide lid 60 can be secured to the inner sides of the holding portions 42, and attachment recess portions (step portions) 42b to which the mirror 50 described later can be attached can also be secured to the outer sides of the holding portions 42 (see FIG. 3). The pair of side walls 41 and the respective holding portions 42 correspond to "a pair of guide rails" described in the claims.

Blocks 42c are formed on one end side of these holding portions 42 (on the front end side in the opening direction of the slide lid 60). Each of the blocks 42c is formed on its lower part (on the side facing the frame 40) with a curved surface 42d curved toward the slide groove 42a. Thereby, as described later, when the slide lid 60 is attached to the pair of side walls 41 and the respective holding portions 42 (the pair of slide grooves 42a) of the frame 40 such that the pair of longer edges 65 are respectively guided, the slide lid 60 is allowed to be obliquely inserted relative to the pair of side walls 41 and the respective holding portions 42 in such a manner that the knob 61 of the slide lid 60 runs over the frame 40.

Further, a first protrusion 43 that allows a resin spring 64 of the slide lid 60 described later to be bent is formed on one end side of each side wall 41 (on the front end side in the closing direction of the slide lid 60). These first protrusions 43 are formed to face the pair of side walls 41. With this configuration, the sliding of the resin springs 64 (slide lid 60) can be restricted so as to hold the slide lid 60 at a closed position. The closed position is a position at which the slide lid 60 covers a mirror surface 51 of the mirror 50.

Further, a second protrusion 44 that allows the resin spring 64 of the slide lid 60 described later to be bent is formed on the other end side of each side wall 41 (on the front end side in the opening direction of the slide lid 60). These second protrusions 44 are also formed to face the pair of side walls 41. With this configuration, the sliding of the resin springs 64 (slide lid 60) can be restricted so as to hold the slide lid 60 at an open position. The open position is a position at which the slide lid 60 exposes the mirror surface 51 of the mirror 50.

Engagement claws 45 for preventing the mirror 50 attached in attachment recesses 42b from coming off are formed on one end side and the other end side of these side walls 41. In addition, the respective other ends of these side walls 41 are provided with guide pieces 46. Thereby, when the slide lid 60 is attached to the pair of side walls 41 and the pair of holding portions 42 (the pair of slide grooves 42a) such that the pair of longer edges 65 are respectively guided as described later, the guiding effect for this attachment can be attained.

Both corners on the front end side of each guide piece 46 are chamfered (chamfered portions 46a). Accordingly, when the mirror unit 5 is mounted on the one half body 3 as described later, the pair of guide pieces 46 of the mirror unit 5 can be easily hooked on the other shorter edge 16 of the one half body 3. In addition, recess portions 47 that are recessed outward are formed on the other end side of the side walls 41 (see FIG. 3). A shorter edge on the opposite side of the pair of guide pieces 46 of the frame 40 is provided with a pair of engagement holes 48 that can be engaged with a pair of engagement claws 18 of the one half body 3. The frame 40 is configured as described above. The frame 40 thus configured is integrally formed of a synthetic resin having rigidity (for example, PP or the like).

Figure 2:
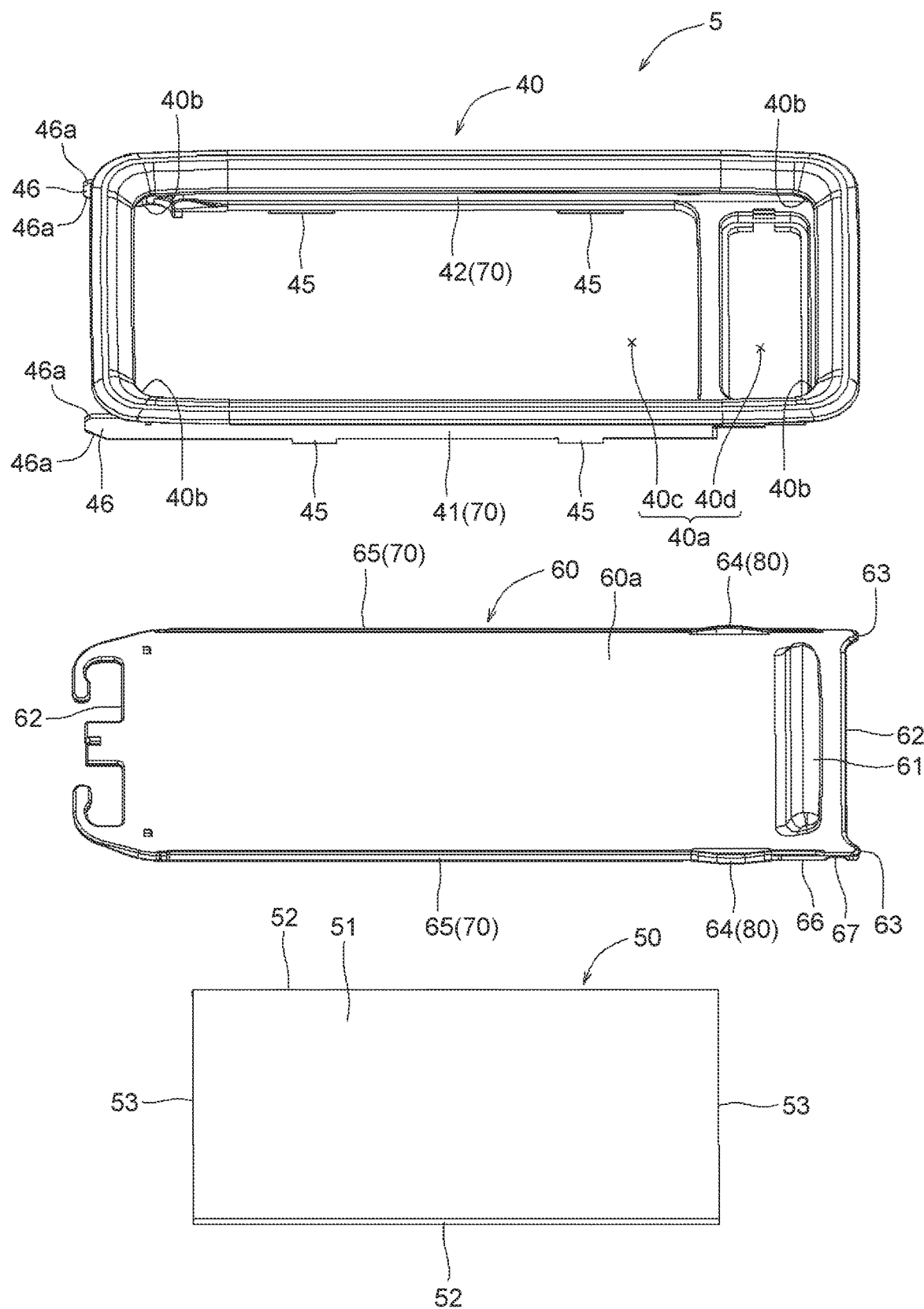
FIG. 2 is an exploded view of a mirror unit of FIG. 1.
Figure 3:
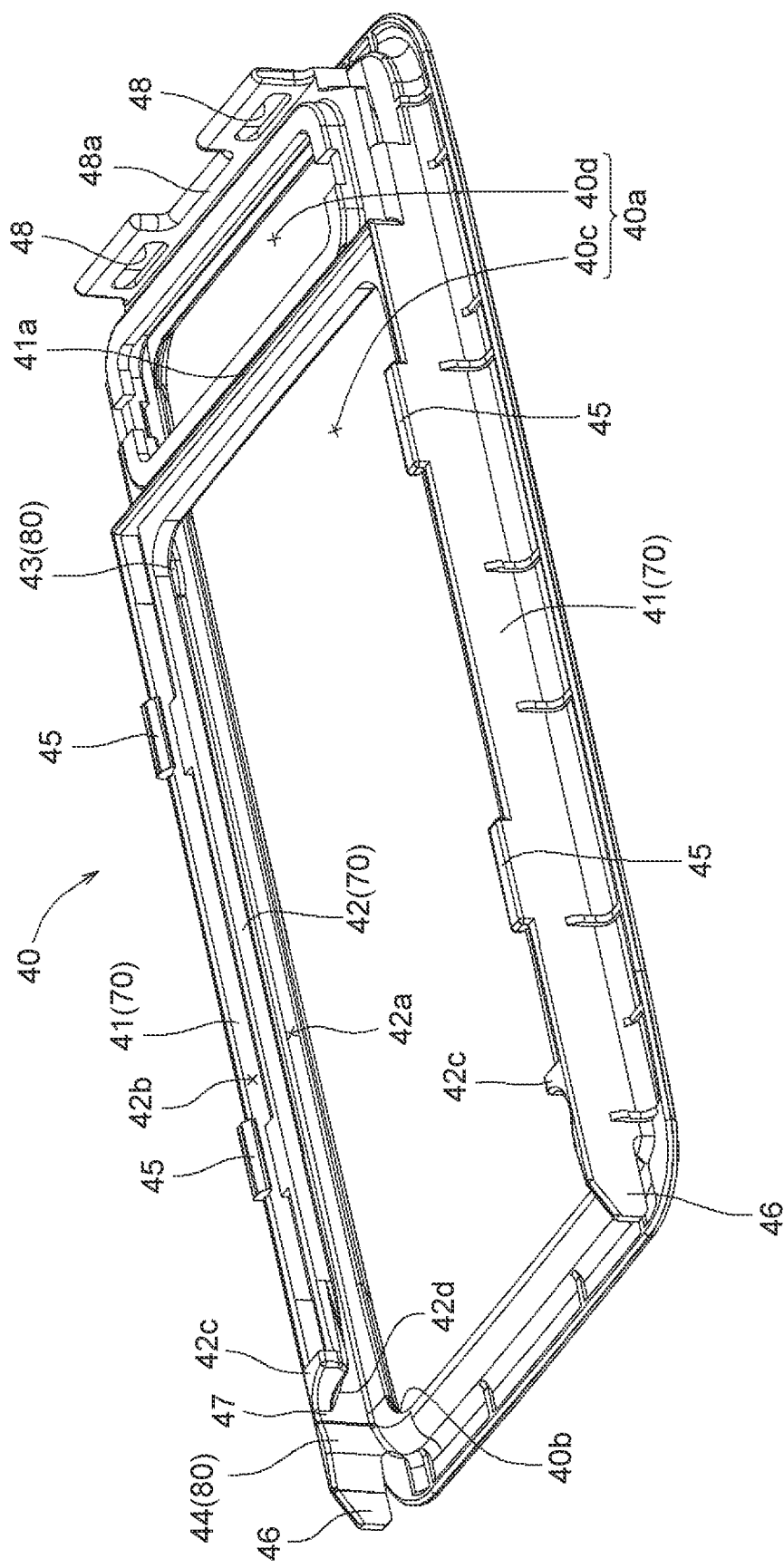
FIG. 3 is a perspective view of a frame of FIG. 2 as viewed from the opposite side.
Figure 4:
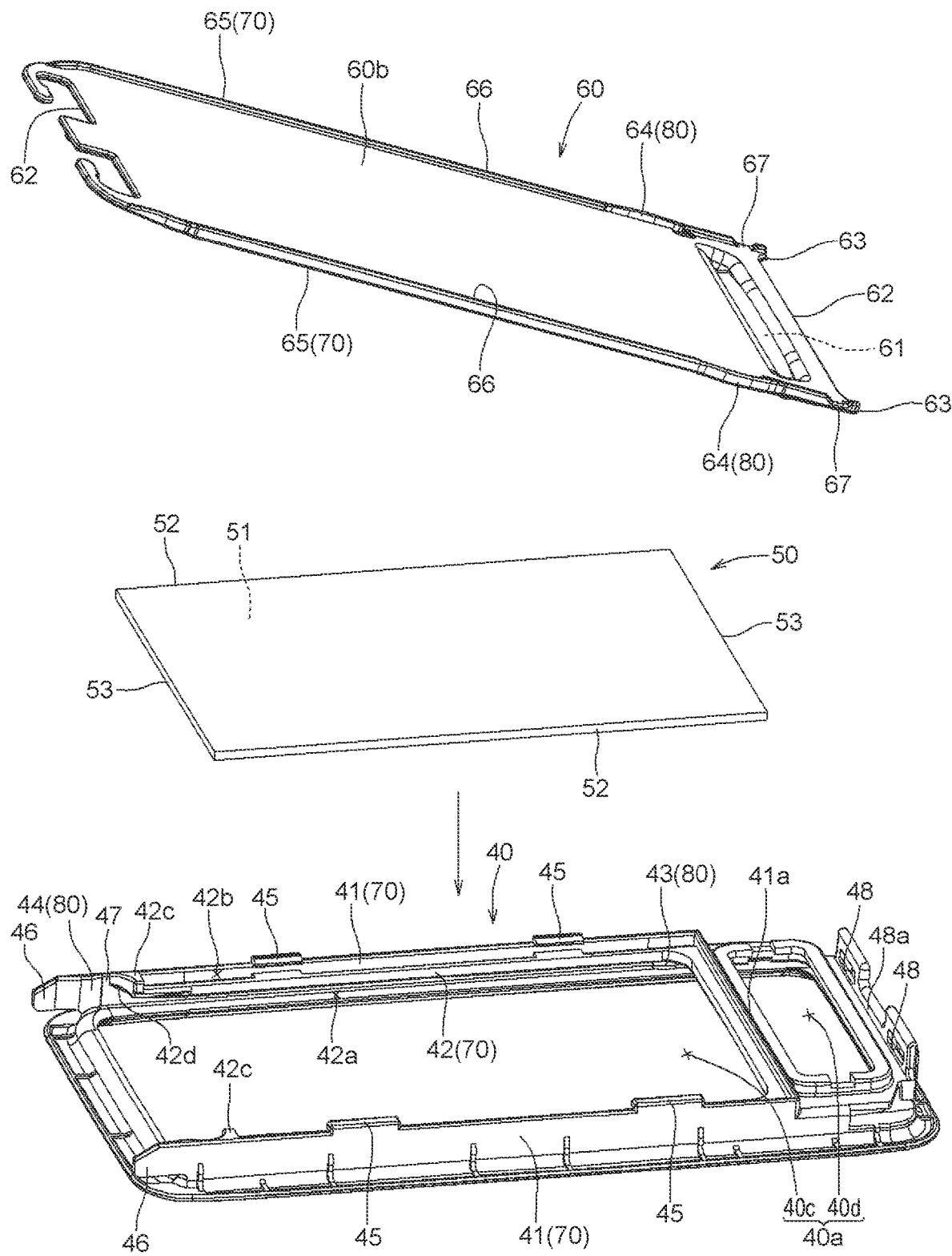
FIG. 4 is a view explaining a step of assembling the mirror unit in FIG. 2.
Figure 5:
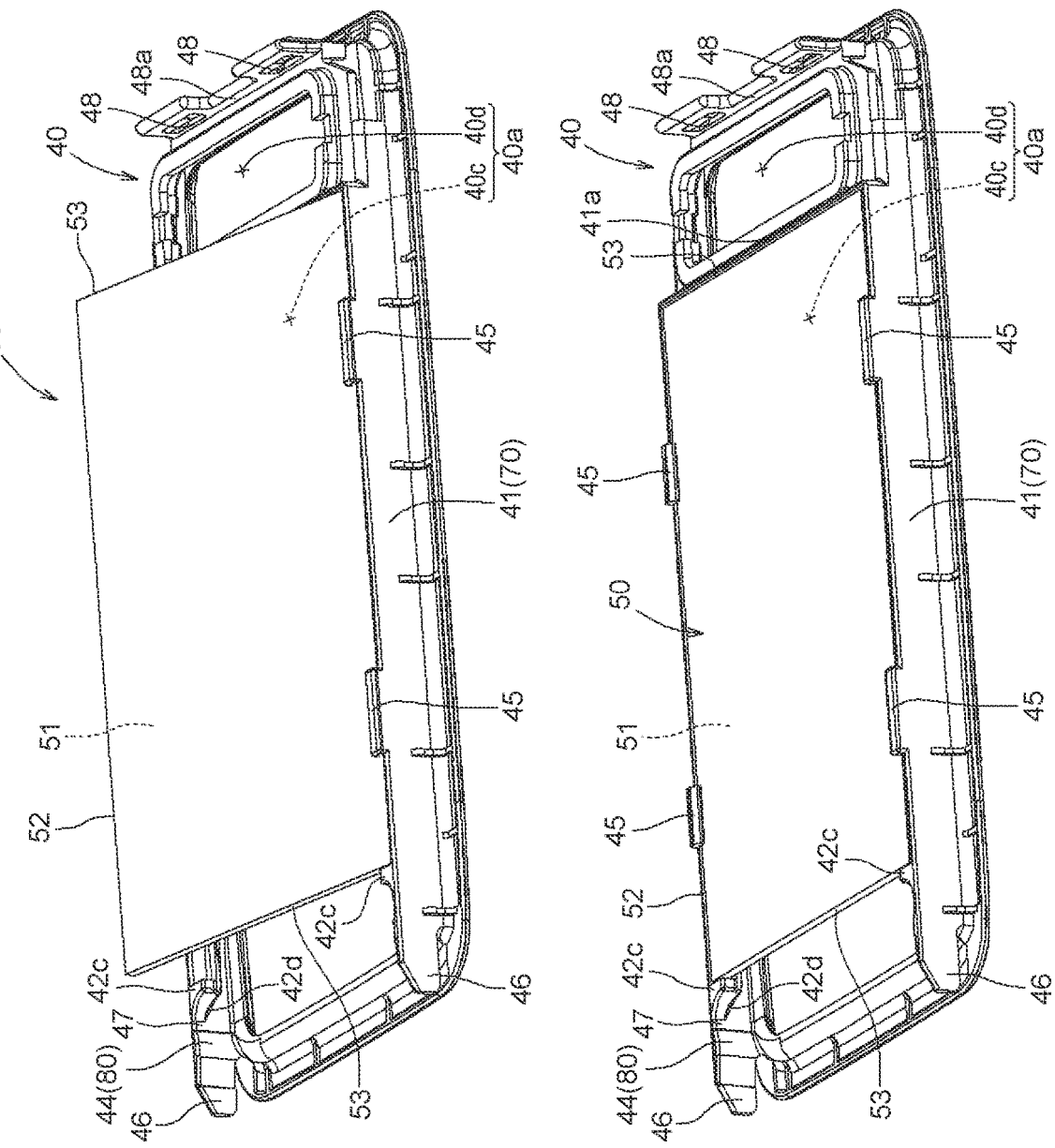
FIG. 5 is a view explaining a step subsequent to FIG. 4.

The mirror 50 is configured by a glass member having the mirror surface 51 on its one surface (see FIG. 2). Therefore, a person or an object (not shown) can be reflected on this mirror surface 51. This mirror 50 is formed in a size corresponding to a rectangular shape surrounded by the pair of side walls 41 of the frame 40, the bridging member 41a, and the pair of blocks 42c.

The slide lid 60 can be attached to the frame 40, and is configured by a rectangular lid member capable of closing the main opening 40a of the frame 40 (see FIG. 2). The knob 61 in a protruding shape is formed on one end side of the outer surface 60a of this slide lid 60 (on the front end side in the closing direction of the slide lid 60). Thus, a finger (not shown) can be hooked on this knob 61 to slide the slide lid 60. Therefore, it is possible to prevent the finger from slipping on the slide lid 60.

Further, corner portions 63 in a protruding shape are formed at both ends of a shorter edge 62 on one end side of this slide lid 60 (on the front end side in the closing direction of the slide lid 60). Thus, when the slide lid 60 is slid to the closed position, in spite of the R portions 40b formed at the corners of the main opening 40a of the frame 40, it is possible to prevent gaps from being generated at the corners of the main opening 40a. Therefore, the design property of the mirror unit 5 when the slide lid 60 is closed can be enhanced.

The resin springs 64 are formed on one end side of the longer edges 65 of this slide lid 60 (on the front end side in the closing direction of the slide lid 60). These resin springs 64 are formed so as to face the pair of longer edges 65. Further, ribs 66 are formed on the respective longer edges 65 in the longitudinal direction of inner surfaces 60b of the slide lid 60 (see FIG. 2).

A recess portion 67 is formed on one end side of each rib 66 (on the front end side in the opening direction of the slide lid 60). These recess portions 67 are formed at respective portions facing the curved surfaces 42d of the frame 40 when the slide lid 60 is obliquely inserted, as described later.

The slide mechanism 70 is configured by the pair of side walls 41 and the respective holding portions 42 of the frame 40, and the pair of longer edges 65 of the slide lid 60. The position holding mechanism 80 is configured by the pair of first protrusions 43 and the pair of second protrusions 44 of the side walls 41 of the frame 40, and the pair of resin springs 64 of the slide lid 60.

Next, the procedure of assembling the frame 40, the mirror 50, and the slide lid 60 into the mirror unit 5 will be described with reference to FIGS. 4 to 10. First, an operation of turning the mirror surface 51 of the mirror 50 toward the frame 40 (a first operation) is performed (see FIG. 4). Next, the following operation (a second operation) is performed: one longer edge 52 of the mirror 50 with the mirror surface 51 thus turned is pressed against the inner sides of the side wall 41 and the holding portion 42 on one side of the frame 40; further, a shorter edge 53 on one side of the mirror 50 is pressed against the inner side of the bridging member 41a; and further, the short edge 53 on the other side of the mirror 50 is pressed against the inner side of the one block 42c, and the engagement claws 45 on one side are then engaged with the longer edge 52 thus pressed on the one side (see FIG. 5).

Next, the following operation (third operation) is performed: while this engagement state is maintained, the longer edge 52 on the other side of the mirror 50 is pressed against the inner sides of the side wall 41 and the holding portion 42 on the other side of the frame 40; further, the shorter edge 53 on the one side of the mirror 50 is pressed against the inner side of the bridging member 41a; and further, the short edge 53 on the other side of the mirror 50 is pressed against the inner side of the other block 42c, and then the engaging claws 45 on the other side are engaged with the longer edge 52 thus pressed on the other side. Thereby, the mirror 50 is attached into the attachment recesses 42b of the frame 40.

Figure 6:
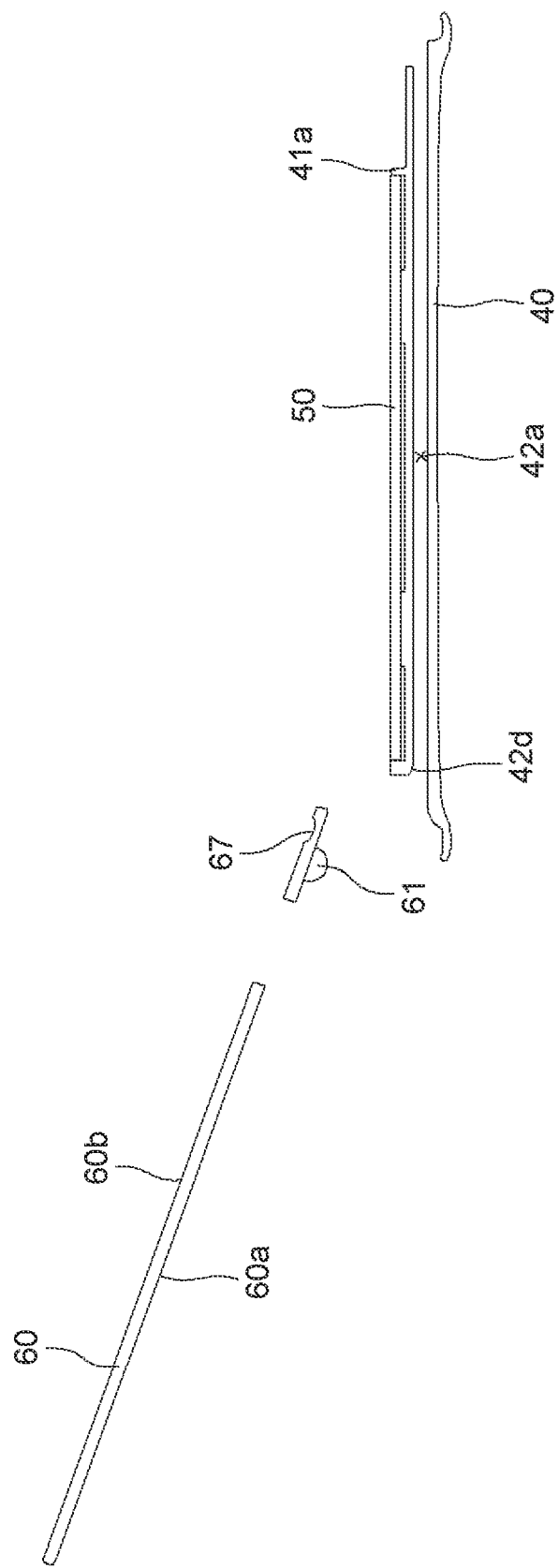
FIG. 6 is a view explaining a step subsequent to FIG. 5.
Figure 8:
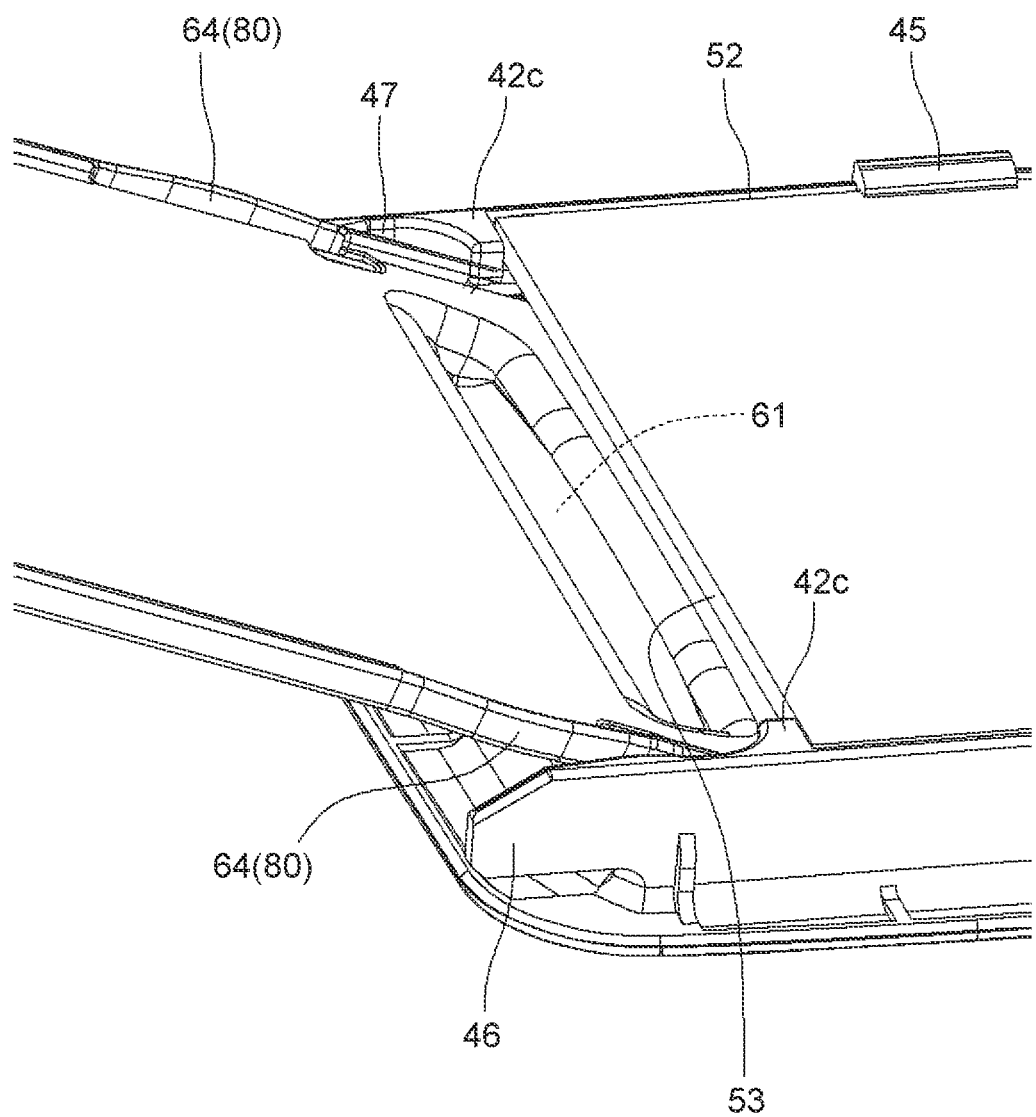
FIG. 8 is a perspective view of a major part of FIG. 7.
Figure 10:
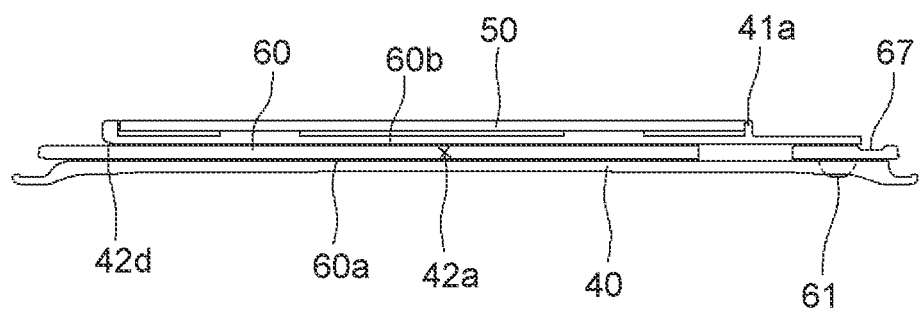
FIG. 10 is a view explaining a step subsequent to FIG. 9.

Next, an operation (a fourth operation) of holding the slide lid 60 inclined relative to the frame 40 to which the mirror 50 is attached is performed (see FIG. 6). The degree of this inclination is an angle at which the knob 61 of the slide lid 60 to be inserted does not interfere with the frame 40 in the subsequent operation. Next, an operation (a fifth operation) of setting one side of the slide lid 60 thus obliquely held at the entrances of the pair of slide grooves 42a of the frame 40 is performed (see FIGS. 7 to 8).

Next, an operation (a sixth operation) of rotating the slide lid 60 thus set about its one side as a fulcrum so as to set the slide lid 60 substantially parallel to the frame 40 is performed (see FIG. 9). Finally, an operation (a seventh operation) of inserting the slide lid 60 thus set substantially in parallel into the pair of slide grooves 42a of the frame 40 is performed (see FIG. 10). Thereby, the mirror 50 is attached into the slide grooves 42a of the frame 40, and the assembly of the mirror unit 5 is completed.

After the one half body 3 and the other half body 4 are fitted to each other, the assembled mirror unit 5 is mounted into the opening 13 of the one half body 3. This mounting is performed by hooking the pair of guide pieces 46 of the mirror unit 5 on the shorter edge 16 on one side of the one half body 3, and pushing the mirror unit 5 into the opening 13 while this hooking state is maintained. This pushing allows the pair of engagement claws 18 of the one half body 3 to be engaged with the pair of engagement holes 48 of the mirror unit 5. Thereby, the mirror unit 5 is mounted in the opening 13 of the one half body 3, and the assembly of the sun visor main body 2 is then completed. The sun visor main body 2 is configured as described above.

The mirror unit 5 according to the embodiment of the present invention is configured as described above. According to this configuration, the blocks 42c are formed on one end side of the holding portions 42 of the frame 40 (on the front end side in the opening direction of the slide lid 60). Each block 42c is formed on its lower side (on the side facing the frame 40) with the curved surface 42d curved toward the slide groove 42a. Therefore, when attaching the slide lid 60 to the frame 40, it is possible to prevent the knob 61 of the slide lid 60 from interfering with the frame 40, and thus this attachment work can be completed in only two steps (step A1 to step A2). To explain these two steps, the step A1 is a step of performing the operation of setting one side of the obliquely held slide lid 60 at the entrances of the pair of slide grooves 42a of the frame 40 (the fifth operation) (see FIGS. 7 to 8). This step A2 includes: the step of rotating the slide lid 60 thus set about its one side as a fulcrum so as to set the slide lid 60 substantially parallel to the frame 40 (the sixth operation) (see FIG. 9); and the step of performing insertion of the slide lid 60 thus set substantially in parallel into the pair of slide grooves 42a of the frame 40 (the seventh operation) (see FIG. 10). This A2 step includes the two operations (the sixth operation and the seventh operation), and these two operations are continuously carried out; thus, they can be considered as substantially one step. Therefore, it is possible to simply the attachment work of the slide lid 60 with the knob 61 relative to the frame 40.

According to this configuration, the recess portions 67 are formed on one end side (on the front end side in the opening direction of the slide lid 60) of the ribs 66 of the slide lid 60. These recess portions 67 are formed at portions facing the curved surfaces 42d of the frame 40 when the slide lid 60 is obliquely inserted. Therefore, when the slide lid 60 is attached to the frame 40, the slide lid 60 hardly interferes with the curved surfaces 42d of the holding portions 42 of the frame 40. Accordingly, the slide lid 60 can be smoothly attached to the frame 40.

Further, according to this configuration, the recess portions 47 recessed outward are formed on the other end side of the side walls 41 of the frame 40. Therefore, when the slide lid 60 is attached to the frame 40, a wider space of the frame 40 for accepting the end of the slide lid 60 on the attachment side (on the insertion side) can be secured. Therefore, it is possible to smoothly perform the attachment of the slide lid 60 relative to the frame 40.

REFERENCE SIGNS LIST

1 SUN VISOR
2 SUN VISOR MAIN BODY
3 ONE HALF BODY
4 THE OTHER HALF BODY
5 MIRROR UNIT
11 INNER SURFACE
40 FRAME
41 SIDE WALL (GUIDE RAIL)
42 HOLDING PORTION (GUIDE RAIL)
42d CURVED SURFACE
43 FIRST PROTRUSION
44 SECOND PROTRUSION
50 MIRROR
51 MIRROR SURFACE
60 SLIDE LID
61 KNOB
64 RESIN SPRING
65 LONGER EDGE
70 SLIDE MECHANISM
80 POSITION HOLDING MECHANISM

The invention claimed is:
1. A mirror unit mounted on a sun visor main body of a vehicle sun visor,
the mirror unit comprising:
a frame-shaped frame separate from or integral with the sun visor main body;

a mirror attached to the frame;
a slide lid attached to the frame and having a knob; and
a slide mechanism comprising a pair of guide rails that guides opposed edges of the slide lid and configured to allow a sliding movement of the slide lid relative to the frame between an opening position at which a mirror surface of the mirror is exposed and a closing position at which the mirror surface of the mirror is covered,
ends of the pair of guide rails comprise curved surfaces that allow the slide lid to be inserted into the pair of guide rails obliquely with respect to a direction of the sliding movement so that the knob of the slide lid runs over the frame when the slide lid is attached to the pair of guide rails of the frame such that the opposed edges of the slide lid are guided by the respective guide rails as the slide lid continues in the direction of the sliding movement.

2. The mirror unit according to claim 1, wherein
the slide lid comprises first recess portions at portions facing the curved surfaces of the pair of guide rails in a state of being obliquely inserted.

3. The mirror unit according to claim 1, wherein
second recess portions are at ends of the pair of guide rails.

\* \* \* \* \*